(12) United States Patent
Tredwell

(10) Patent No.: US 9,851,459 B2
(45) Date of Patent: Dec. 26, 2017

(54) THRESHOLD VOLTAGE CALIBRATION AND COMPENSATION CIRCUIT FOR A DIGITAL RADIOGRAPHIC DETECTOR

(71) Applicant: Carestream Health, Inc., Rochester, NY (US)

(72) Inventor: Timothy J. Tredwell, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 14/972,628

(22) Filed: Dec. 17, 2015

(65) Prior Publication Data

US 2016/0178768 A1 Jun. 23, 2016

Related U.S. Application Data

(60) Provisional application No. 62/093,453, filed on Dec. 18, 2014.

(51) Int. Cl.
 *G01T 7/00* (2006.01)
 *G01T 1/24* (2006.01)
 *H04N 5/32* (2006.01)
 *H04N 17/00* (2006.01)

(52) U.S. Cl.
 CPC .............. *G01T 7/005* (2013.01); *G01T 1/247* (2013.01); *H04N 5/32* (2013.01); *H04N 17/002* (2013.01)

(58) Field of Classification Search
 CPC ..................................................... G01T 7/005
 See application file for complete search history.

(56) References Cited

U.S. PATENT DOCUMENTS

| | | | |
|---|---|---|---|
| 5,818,070 A | 10/1998 | Yamazaki et al. | |
| 6,492,802 B1 * | 12/2002 | Bielski | G01R 31/2829 324/537 |
| 6,603,453 B2 | 8/2003 | Yamazaki et al. | |
| 7,532,187 B2 | 5/2009 | Afentakis et al. | |
| 2004/0095488 A1 * | 5/2004 | Rambaldi | H04N 5/367 348/246 |
| 2014/0094993 A1 * | 4/2014 | Johnson | H04N 17/002 701/1 |

OTHER PUBLICATIONS

H.C. Tuan et al., "IVA-2 Dual-Gate a-Si:H Thin-Film Transistors on Bulk Glass," IEEE Transactions on Electron Devices, vol. 29, No. 10, Oct. 1982, p. 1682.

(Continued)

*Primary Examiner* — David Porta
*Assistant Examiner* — Hugh H Maupin

(57) ABSTRACT

A two dimensional array of digital imaging pixels each include a photo-sensing element and a readout element. A test element within the two-dimensional array, a column of test elements peripheral to the array, or test monitoring circuits peripheral to the array are constructed using the same process as the readout elements. The test element within the array and the column of test elements are connected to a first and second external voltage sources. The test element within the two-dimensional array and the column of test elements may be connected to a test data line or to a data line used by the imaging pixels.

19 Claims, 14 Drawing Sheets

(56) References Cited

OTHER PUBLICATIONS

Kyoung-Seok Son et al., "Characteristics of Double-Gate Ga—In—Zn—O Thin-Film Transistor," IEEE Electron Device Letters, vol. 31, No. 3, Mar. 2010, pp. 219-221.
Ya-Hsiang Tai et al., "Three-Transistor AMOLED Pixel Circuit With Threshold Voltage Compensation Function Using Dual-Gate IGZO TFT," IEEE Electron Device Letters, vol. 33, No. 3, Mar. 2012, pp. 393-395.
N.D. Jankovic et al., "Vth compensated AMOLED pixel employing dual-gate TFT driver," IEEE Electron Letters, vol. 47, No. 7, Mar. 2011, 2 pages.
Zhibin Xiong et al., "A New Polysilicon CMOS Self-Aligned Double-Gate TFT Technology," IEEE Transactions on Electron Devices, vol. 52, No. 12, Dec. 2005, pp. 2629-2633.
Sanghun Jeon et al., "Dual Gate Photo-Thin Film Transistor with High Photoconductive Gain for High Reliability, and Low Noise Flat Panel Transparent Imager," Proceedings of the 2011 International Electron Device Meeting, 2011, pp. 14.3.1-14.3.4.

\* cited by examiner

THRESHOLD VOLTAGE CALIBRATION AND COMPENSATION CIRCUIT FOR A DIGITAL RADIOGRAPHIC DETECTOR

CROSS REFERENCE TO RELATED APPLICATIONS

This application claims priority to U.S. Patent Application Ser. No. 62/093,453, filed Dec. 18, 2014, in the name of Tredwell, and entitled THRESHOLD VOLTAGE CALIBRATION AND COMPENSATION CIRCUIT FOR A DIGITAL RADIOGRAPHIC DETECTOR.

FIELD OF THE INVENTION

The subject matter disclosed herein is directed to the field of radiographic digital imaging arrays and, in particular, to calibration and compensation for maintaining the threshold voltage uniformity and stability of the row-select thin-film-transistor (TFT) in the pixels of a radiographic imaging array.

BACKGROUND OF THE INVENTION

FIG. 1A illustrates a fundamental circuit diagram of a passive pixel commonly used in digital radiographic detectors for x-ray imaging. An exemplary portion of a two dimensional passive pixel array is illustrated in FIG. 1B, wherein a 2×3 array is made up of pixels as shown in FIG. 1A.

The pixel of FIG. 1A comprises a photo-sensing element (photodiode) and a readout element (TFT). In the array schematic shown in FIG. 1B, the photo-sensing element is a PIN photodiode and the switching device is a TFT with source, gate and drain, although other photo-sensing elements and alternative switching elements may be employed. In the circuit of FIGS. 1A-1B the anode of the diode is connected to a bias supply $V_{BIAS}$. The cathode of the diode is connected to the drain of the TFT. The gate of the TFT is controlled by a gate line. The gate line is oriented along the (horizontal) row direction and typically connects the gates of all the pixels in a row to a row address circuit, or row select circuit. The row address circuit, which is positioned peripheral to the array, sequentially addresses each row, momentarily switching the TFT in the pixels along that row from an insulating (off) into a conducting (on) state. The source of the TFT is connected to a data line, which is oriented in the (vertical) column direction of the array and is typically connected to all pixels in that column. Each data line is connected to a signal sensing circuit peripheral to the array. In the circuit of FIG. 1B, the signal sensing circuit comprises a charge amplifier including an operational amplifier (op amp), a feedback capacitor ($C_f$), a reference voltage supply ($V_{ref}$), and a reset switch (RS). The charge amplifier senses the amount of charge required to reset the data line to the reference voltage by measuring the charge on the feedback capacitor.

In typical operation, the cathodes of all photodiodes in the array are reset to $V_{REF}$ by sequentially addressing each row of pixels. The photodiode voltage is thus reset to $V_{BIAS} - V_{REF}$. In the presence of X-ray exposure, the photo-charge is stored on the photodiode. Following exposure the charge in the array may be read out by sequentially addressing each of the rows, transferring the charge in the photodiodes in that row to the respective data lines, and sensing the charge in the charge amplifier connected to each of the data lines.

For successful operation, it is important that the TFT have high resistance between source and drain in the "off" state to prevent charge leakage from the photodiode to the data line. The leakage current $I_{DS}$ through the TFT from the photodiode to the data line in each pixel in the "off" state is given by $I_{DS}=R_{off}(VG_{off})\cdot V_{DS}=R_{off}(VG_{off})\cdot Q_{photo}/C_{PD}$ where $R_{off}$ is the off-state resistance of the TFT at the gate voltage $VG_{off}$ and $V_{DS}$ is the voltage difference between source and drain produced by the photo-charge $Q_{photo}$ and the photodiode capacitance $C_{PD}$. In typical digital radiographic imaging arrays a value of $R_{off}(VG_{off})>10^{14}\Omega$ is desired to prevent loss of signal charge prior to array readout.

It is also important that the TFT have low resistance between drain and source in the "on" state $R_{on}(VG_{on})$ in order to minimize the time required to transfer charge from the photodiode to the data line. The time constant $\tau_{RC}$ for the transfer of charge is given by $\tau_{RC}=R_{TFT}(VG_{on})C_{PD}$ where $R_{TFT}(VG_{on})$ is the resistance between TFT source and drain (typically called the channel resistance) at a gate voltage of $VG_{on}$ and $C_{PD}$ is the photodiode capacitance. Switching the TFT gate to $VG_{on}$ for three or more time constants $\tau_{RC}$ allows 95% or more of the stored charge to be transferred from the diode to the data line.

For typical radiographic imaging arrays, the photodiode capacitance $C_{PD}$ is in the range of 1-3 pF and the TFT materials and dimensions are chosen to achieve $R_{TFT}$ of about 0.5-5 MΩ in order to achieve $\tau_{RC}$ in the range of 1-10 μs. This allows imaging arrays with greater than 3,000 rows to be read out in a time significantly less than 1 second.

Amorphous silicon thin-film transistors (a-Si TFTs) have been widely used in digital radiographic detectors. A-Si TFTs typically have excellent uniformity both over an individual array and from array to array. They also are stable over the total-dose of radiation exposure over the life of a radiographic detector. However, they have low electron mobility, which leads to a long charge transfer time constant $\tau_{RC}$. Although the $\tau_{RC}$ may be reduced by increasing the width of the a-Si TFT, this results in increased TFT gate-to-source capacitance $C_{GS}$, which causes high data line capacitance and thereby high noise and high clock feedthrough. Alternative semiconductor materials for TFT's include metal oxide TFT's, such as $InGaZnO_4$ or low-temperature polysilicon (LTPS), which display significantly higher mobility than a-Si TFT's. TFT's fabricated with $InGaZnO_4$ have mobility about 20× higher than a-Si, allowing faster and lower noise radiographic detector arrays. FIG. 2A shows a cross-section of a typical bottom-gate $InGaZnO_4$ transistor and FIG. 2B shows the transfer characteristics of an $InGaZnO_4$ transistor with gate length of 5 μm and gate width of 20 μm. The graph on the left illustrates the log of drain current ($I_d$ in amps) vs. gate voltage ($V_g$ in V) with different levels of drain-source voltage ($V_{ds}$) at 0.1V, 1V, 5V, and 10V; the graph on the right illustrates the drain current in mA vs. drain voltage ($V_d$ in V) with different levels of gate-source voltage ($V_{gs}$) at 5V, 10V, 15V, and 20V. The threshold voltage (VT) is the voltage at which the transistor switches between low and high resistance states. The TFT of FIGS. 2A-2B may be switched to the "off" state by applying a gate voltage $VG_{off}$ of about −5V to −10V and may be switched to the "on" state by applying a gate voltage $VG_{on}$ of +10V to +30V. However, $InGaZnO_4$ TFT's display significantly higher threshold voltage variability both spatially within an array as well as variability from array to array. $InGaZnO_4$ TFT's display instability in threshold voltage with electrical stress. They also display negative VT shift with radiation exposure. TFT's fabricated with LTPS have mobility about 100× higher than a-Si. However, LTPS TFT's have very large variability in threshold voltage from one TFT to another TFT even on a short spatial scale. They also display variability in threshold voltage across an array, and from array to array. The threshold voltage is also very sensitive to temperature and displays instability with electrical stress and radiation exposure.

Prior-art arrays may utilize a single value of $VG_{on}$ and a single value for $VG_{off}$ which is typically set during manufacturing and expected to remain unchanged for the life of the product. For successful operation of the imaging array using a single value of $VG_{off}$ and a single value of $VG_{on}$ for all TFT's in the array, the TFT's must have values of $R_{on}$ and $R_{off}$ that are uniform over the array, stable over the operating environment of the array, and stable over time. If the threshold voltage of the TFT is highly non-uniform over the array, if it changes with operating environment parameters such as temperature, or if it changes over the life of the product by factors such as radiation damage, some TFT's may display reduced $R_{off}$, causing photodiodes to leak charge onto the dataline even when they are not addressed, while others may display low $R_{on}$, causing incomplete transfer of charge from the photodiode to the data line and thereby causing image lag and ghost images in subsequent frames.

The problem of non-uniform threshold voltage and the problem of unstable threshold voltage is especially observed in high performance TFT devices, such as devices fabricated from re-crystallized polysilicon (LTPS) or metal-oxides (such as $InGaZnO_4$). These high performance TFT devices allow faster readout, smaller size, lower noise, and lower operating voltages than TFT's produced with a-Si. However, the high performance TFT devices are typically less uniform spatially both locally and globally within an array, less uniform from array to array and from glass substrate to glass substrate. High performance TFT devices are also typically more sensitive to radiation exposure. For successful operation of arrays it can be seen that circuits and methods of operation for calibration and correction of threshold voltage would be beneficial.

The discussion above is merely provided for general background information and is not intended to be used as an aid in determining the scope of the claimed subject matter.

BRIEF DESCRIPTION OF THE INVENTION

The present patent application discloses three advantageous features for a radiographic imaging array: (a) detection that a re-calibration is required, (b) pixel-by-pixel calibration of the threshold voltage of the row-select TFT and (c) compensation for changes in the threshold voltage. These same principles are extensible to other radiographic imaging array architectures, including active pixel arrays in which TFT's perform reset and amplification functions as well as the pixel selection function.

A two dimensional array of digital imaging pixels each include a photo-sensing element and a readout element. A test element within the two-dimensional array, a column of test elements peripheral to the array, or test monitoring circuits peripheral to the array are constructed using the same process as the readout elements. The test element within the array and the column of test elements are connected to a first and second external voltage sources. The test element within the two-dimensional array and the column of test elements may be connected to a test data line or to a data line used by the imaging pixels.

In one embodiment, a digital radiographic imaging system includes a passive-pixel imaging array in which the pixels each comprise a photo-sensing element and a thin-film-transistor readout element. A calibration mechanism measures one or more affected properties of the thin-film-transistor readout elements caused by one or more of (a) X-ray exposure, (b) environmental exposure, (c) temperature, (d) aging, and (e) aging under electrical stress. A control circuit is configured to adjust one or more driving parameters for the thin-film-transistor based on affected changes in the threshold voltage of the thin-film-transistors. A required adjustment in one or more of the driving parameters is based on the change in threshold voltages of the thin-film-transistors.

In another embodiment, a method of operating a digital radiographic imaging system that includes a passive-pixel imaging array in which the pixels of the imaging array each comprise a photo-sensing element and a thin-film-transistor readout element is disclosed. One or more properties of the thin-film-transistor readout elements is measured wherein the properties are affected by one or more of (a) X-ray exposure, (b) environmental exposure, (c) temperature, (d) aging, (e) aging under electrical stress. Defective pixel locations are stored in an electronic memory, whereby defective pixels may be concealed or disabled.

The summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The drawings below are intended to be drawn neither to any precise scale with respect to relative size, angular relationship, relative position, or timing relationship, nor to any combinational relationship with respect to interchangeability, substitution, or representation of a required implementation.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

A calibration process for obtaining optimum compensation voltages for each pixel is described herein. The calibration process may be performed at manufacture, may be performed at regular intervals, or may be performed prior to every exposure sequence. The type of calibration process for occasional calibration may be more complicated and involve array exposure since this could be performed in the absence of a patient. Calibration performed prior to every exposure, on the other hand, would need to be simple, fast, and not involve X-ray exposure in order to avoid incremental radiation exposure to the patient.

Figure 3A:
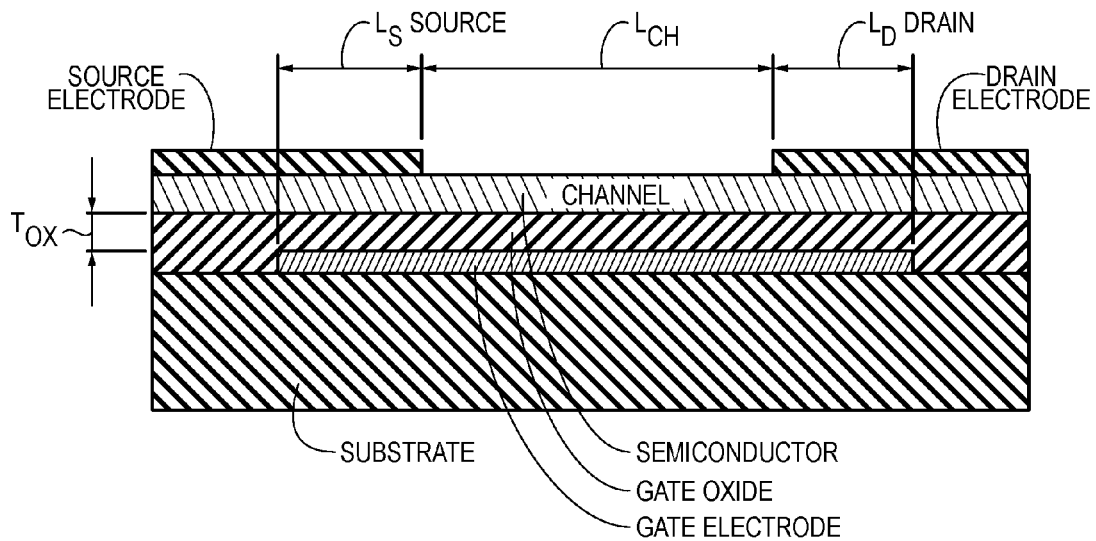
FIGS. 3A-3B are a cross-sectional view of a readout row-select TFT, and a plot of gate to source capacitance ($C_{GS}$) vs. gate to source voltage ($V_{GS}$).
Figure 3B:
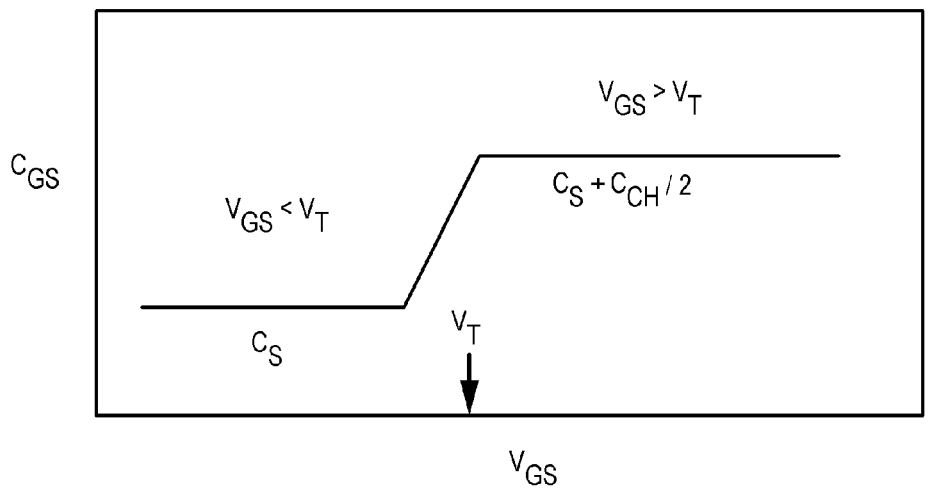

A first embodiment of the calibration process may be performed without X-ray exposure to the array. In this method, the capacitance between gate and source of the image readout row select TFT is measured as a function of the voltage between the TFT's gate and source ($V_{GS}$). FIG. 3A shows a simplified diagram of the readout row-select TFT. When the transistor is in a non-conducting state ($V_{GS}<V_T$), there is no charge in the channel. As a result, the only capacitance between source and gate, $C_{GS}$, is due to the physical overlap of source and gate. For the simplified diagram of FIGS. 3A-3B, $C_S=\epsilon\epsilon_o L_S W/T_{ox}$ where £ is the dielectric constant, $\epsilon_o$ is the free-space dielectric constant, $T_{ox}$ is the thickness of the gate dielectric, W is the TFT width, and $L_S$ is the overlap distance between source and gate. If the gate voltage is increased above the threshold voltage $V_T$, charge enters the channel. The channel capacitance $C_{CH}$ is shared between source and drain in the linear mode of operation of the TFT. The total gate-to-source capacitance $C_{GS}(V_{GS}>VT)=C_S+C_{CH}/2=££_o(L_S+L_{CH}/2)\cdot W/T_{ox}$ where $L_{CH}$ is the channel length (distance between source and drain electrode). FIG. 3B shows a plot of gate-source capacitance $C_{GS}$ vs. gate-source voltage $V_{GS}$ and illustrates the dependence of $C_{GS}$ on $V_{GS}$. Using this method, it is possible to measure the transistor threshold voltage $V_T$. If a compensation circuit is provided, it is then possible to calibrate the TFT and select an appropriate compensation voltage to compensate for spatial non-uniformity in $V_T$ over the array or to compensate for instability over time caused by effects such as temperature, environmental exposure, or radiation exposure.

Figure 4:
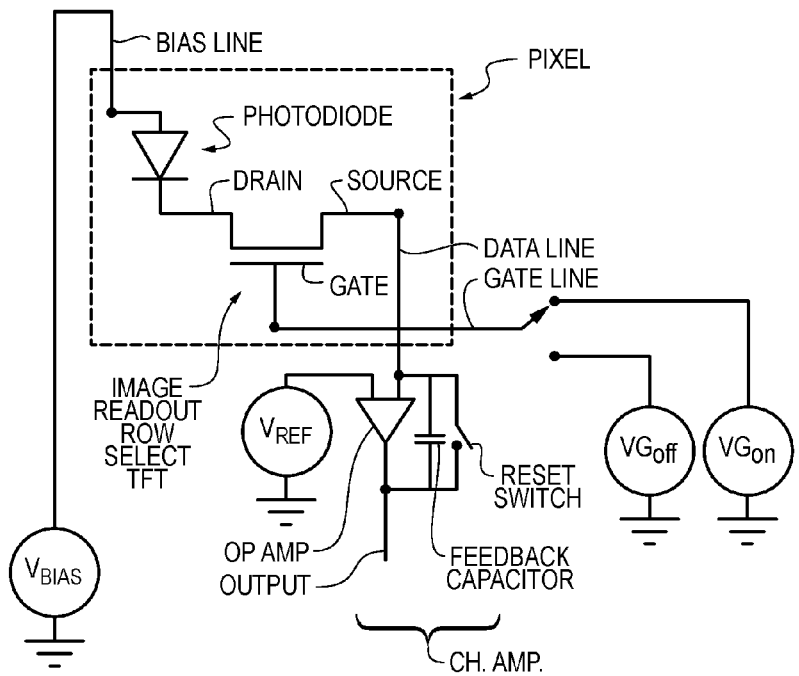
FIG. 4 is a schematic diagram of an exemplary single pixel of an array with charge amplifier, row select, and bias supply for the photodiode.
Figure 5:
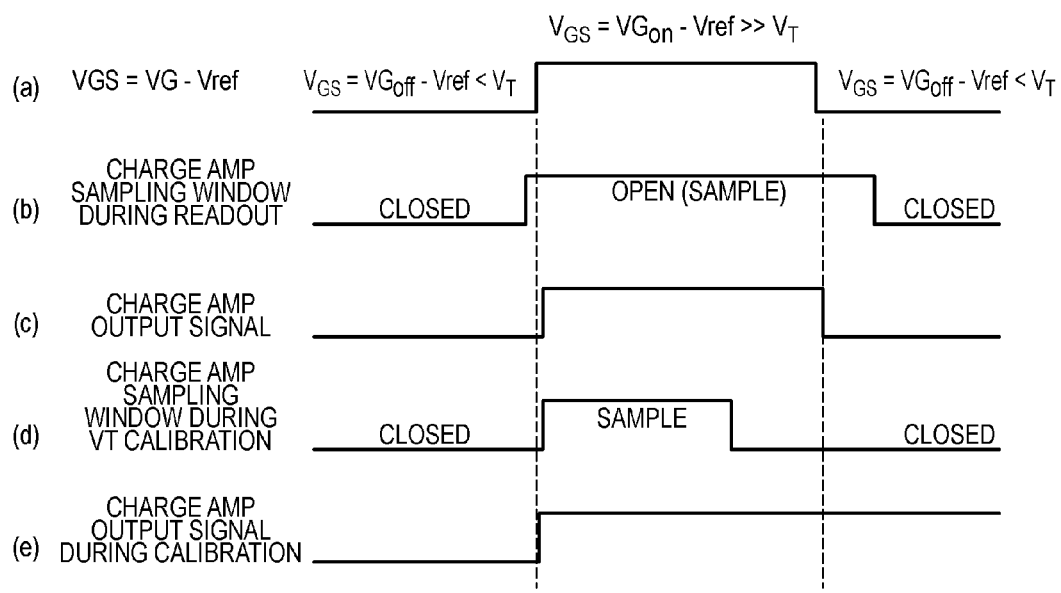
FIG. 5 illustrates plots of (a) $V_{GS}$ vs. time for a row select TFT, (b) a charge amplifier sampling window, (c) charge amplifier output signal vs. time for normal image readout, (d) charge amplifier sampling window, and (e) charge amplifier output vs. time for calibration mode.

FIG. 4 shows an exemplary pixel configuration whereby calibration of the threshold voltage $V_T$ of each pixel in a passive-pixel radiographic imaging array can be calibrated. During normal array image readout, the gate lines are individually addressed by the row-select circuit, which switches the gate line from an "off" voltage $VG_{off}$ to an "on" voltage $VG_{on}$, where $VG_{off}<V_T$ and $VG_{on}$ is typically significantly greater than $V_T$. The charge amplifier (ch amp) maintains the data line voltage at the potential of the reference voltage $V_{REF}$. The TFT gate-to-source voltage $V_{GS}=V_G(t)-V_{REF}$ where t represents time. FIG. 5(a) illustrates the timing of the gate line voltage and the charge amplifier integration period vs. time t. The charge amplifier is normally in the non-integrating, or reset, mode in which the reset switch is closed, thereby maintaining the data line voltage at $V_{REF}$. During image signal integration (sampling period), the reset switch is opened and any charge flowing onto or off of the dataline is integrated on the feedback capacitor of the charge amplifier. At the end of the sampling period, the output signal is latched into a hold circuit awaiting analog-to-digital conversion and readout. The reset switch is then closed.

The charge amplifier sampling window and the output signal of the charge amplifier during normal image readout are illustrated in FIG. 5(b) and FIG. 5(c) respectively. The sampling window begins before or coincident with the switching of the gate line voltage $V_G$ from $VG_{off}$ to $VG_{on}$. As a result, the charge due to the switching of the TFT is integrated on the feedback capacitor of the charge amplifier. This charge is $Q=C_S \cdot (V_T-V_{off})+(C_S+C_{CH}/2) \cdot (V_{on}-V_T)$. The sampling window ends after the switching of the gate line voltage $V_G$ from $VG_{on}$ to $VG_{off}$. During the transition the charge Q is removed from the feedback capacitor, and there is no net charge remaining on the feedback capacitor except for that from any signal remaining on the photodiode.

Figure 1A:
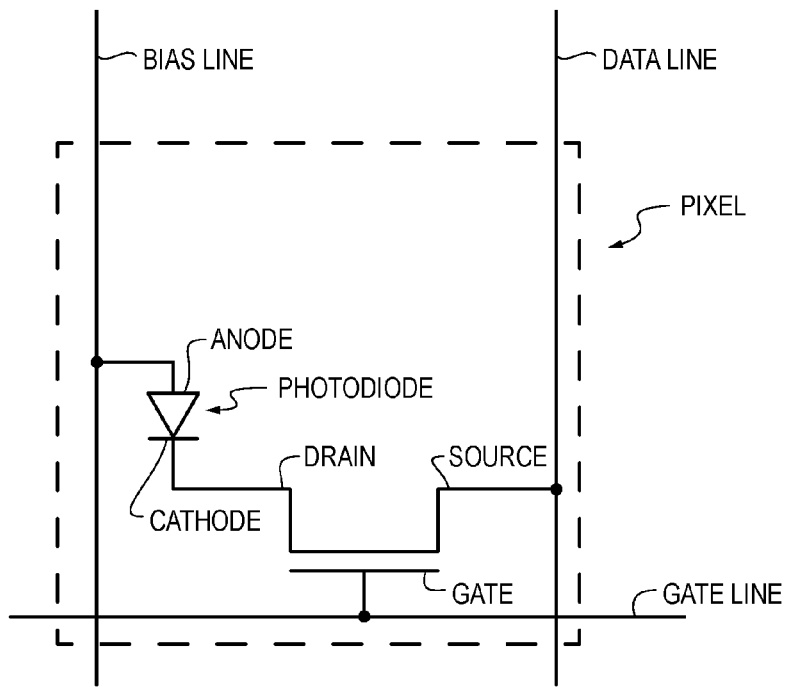
FIGS. 1A-1B are schematic diagrams of an exemplary prior art pixel, and a 2×3 pixel diagram of a prior art array.
Figure 1B:
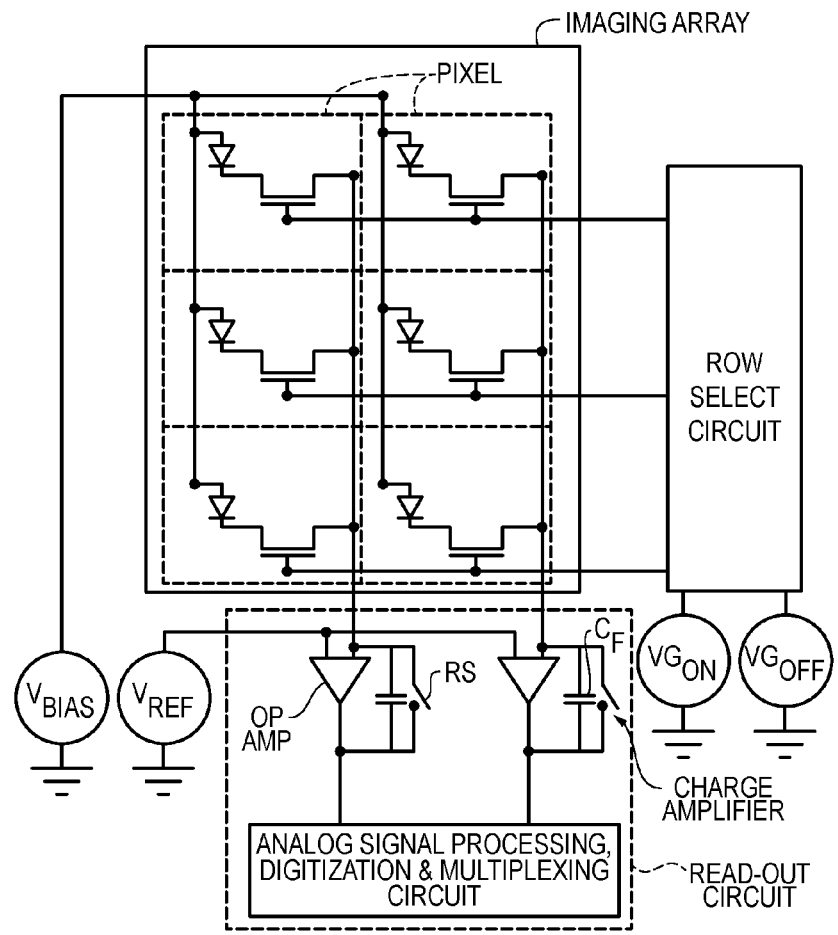
Figure 2A:
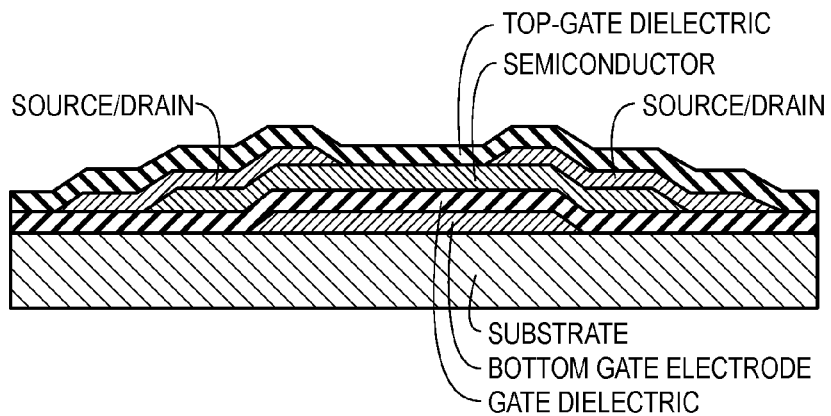
FIG. 2A is a cross-sectional view of an exemplary single-gate TFT.
Figure 2B:
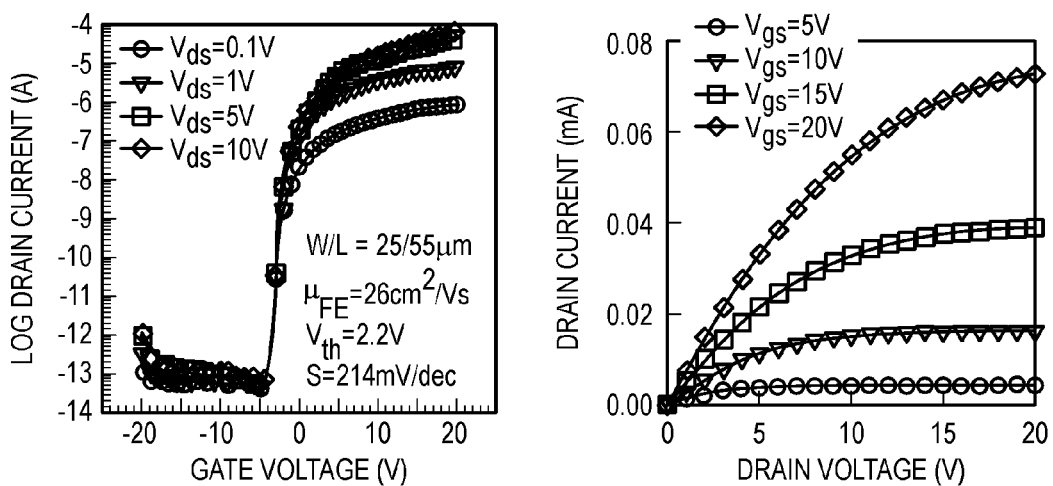
FIG. 2B shows the transfer characteristics of an InGaZnO$_4$ transistor with gate length of 5 μm and gate width of 20 μm.
Figure 6:
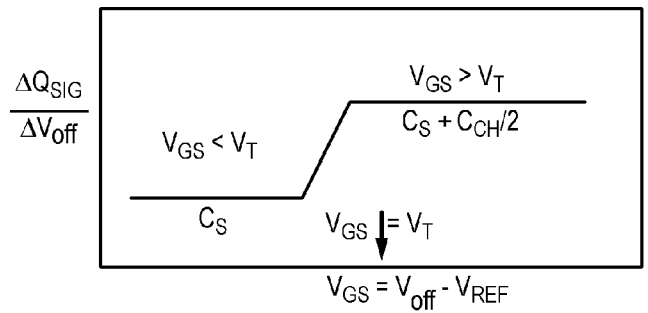
FIG. 6 is a plot of change in signal charge in a charge amplifier with off-gate voltage vs. $V_{GS}=V_{off}-V_{ref}$.

The charge amplifier sampling window and the output signal of the charge amplifier during calibration are illustrated in FIG. 5(d) and FIG. 5(e) respectively. The sampling window begins before or coincident with the switching of the gate line voltage $V_G$ from $VG_{off}$ to $VG_{on}$. As a result, the charge due to the switching of the TFT is integrated on the feedback capacitor of the charge amplifier. This charge is $Q=C_S \cdot (V_T-V_{off})+(C_S+C_{CH}/2) \cdot (V_{on}-V_T)$. The sampling window ends before the switching of the gate line voltage $V_G$ from $VG_{on}$ to $VG_{off}$. As a result the charge due to the gate line transition from $VG_{off}$ to $VG_{on}$ remains on the integrator (feedback capacitor). The output of the charge amplifier, $V_{out}=Q/C_{FB}$ where $C_{FB}$ is the capacitance of the feed-back capacitor, can be sampled, digitized and read out (e.g., FIG. 1B read-out circuit). In order to measure the threshold voltage $V_T$, the gate-line off-voltage can be scanned from below to above the threshold voltage $V_T$ plus the reference voltage $V_{REF}$. The change in signal charge $\Delta Q_{sig}/\Delta V_{off}$ with $V_{off}$ is illustrated in FIG. 6 as a function of $V_{GS}=V_{off}-V_T$. The threshold voltage can be determined by the value of $V_{off}-V_{REF}$ at which $\Delta Q_{sig}/\Delta V_{off}$ increases from $C_S$ to $C_S+C_{CH}/2$.

Since this calibration process can be performed without x-ray exposure to the image sensor, it can be performed on a regular basis without the presence of an X-ray generator. Thus, no intervention or set-up on the part of the operator is required—the calibration can be performed in the background. In a radiographic detection system, there are several methods by which the re-calibration frequency can be determined. The following four examples illustrate methods of determining whether re-calibration is required:

First Example

The frequency over which the detector requires re-calibration for $V_T$ depends on the expected change in threshold voltage. For example, if the threshold voltage is known to change with total X-ray dose received by the image sensor, a re-calibration can be performed once per dose threshold since the prior re-calibration has been achieved. The dose since the last calibration as well as the total dose since inception can be determined from the pixel-wise sum of all exposed images. For example, by maintaining a record that contains the mean X-ray dose or the X-ray dose of all individual pixels or groups of pixels. A decision to re-calibrate may be made on the basis of the X-ray exposure of the pixel receiving the highest dose or on the basis of the mean X-ray exposure since the last calibration and/or on the basis of dose since inception.

Alternatively, if the threshold voltage is known to change with temperature, a re-calibration can be performed if the operating temperature changes from the previous calibration by a preset temperature threshold. If the threshold voltage is known to change with electrical stress, a re-calibration can be performed based on the number of operating hours since the previous calibration.

Second Example

For the example of a n-channel row-select TFT, if the threshold voltage $V_T$ shifts towards negative voltages for the n-channel TFT, then a point will be reached where $V_T<V_{off}$ and current leakage from the photodiode to the data line commences. In $InGaZnO_4$ TFT's, for example, negative threshold shift has been observed with environmental exposure (such as humidity), with X-ray radiation dose, and with long-term electrical stress. In a passive pixel array, if any pixel in a column has a threshold voltage shift such that $V_T<V_{off}$, then charge from an exposed photodiode will leak through the row select TFT and onto the data line when the pixel is not being addressed. If the leakage current flowing from all the diodes on each data line is monitored by the charge amplifier in the absence of row selection, then the increase in leakage current above a threshold value may be used to initiate re-calibration. The leakage current in the data line can be easily monitored by including one or more clock cycles prior to readout of an exposed image during which the output of the charge amplifier is sampled. The output voltage of the charge amplifier $V_{out}$ is related to the sum of the leakage current of all TFT's on a column $I_{leakage}$ by $V_{out}=I_{leakage} \cdot \Delta t/C_{FB}$ where $\Delta t$ is the sampling time of the feedback amplifier and $C_{FB}$ is the capacitance of the feedback capacitor in the charge amplifier.

Third Example

A third method of determining if re-calibration is required utilizes a change in the bias voltage of the photodiode to measure the sum of the leakage currents of all TFT's along a column. This procedure is performed as follows: (a) the array is operated to capture multiple frames sufficient to establish a quiescent state in which the voltage across the photodiode $V_{PD}=V_{BIAS}-V_{REF}$ is at the normal (reverse-bias) operating value and the leakage current on the data-lines is measured as explained above. The photodiode bias $V_{PD}$ is decreased or even slightly forward biased for two or more frames. The charge stored on the photodiode is now $Q_{PD}=C_{PD} \cdot \Delta V_{PD}$. The leakage current on the data line is re-measured during the period when the diode bias has been reduced or even forward biased. If the threshold voltage of one or more TFT's in the column has shifted to a value where the TFT begins to conduct ($V_T<VG_{off}$), then the leakage current on the data line will increase significantly. The radiographic system can track the leakage current during electrical charge injection and a re-calibration can be initiated when this leakage current is observed to increase above a threshold value.

Fourth Example

Figure 7:
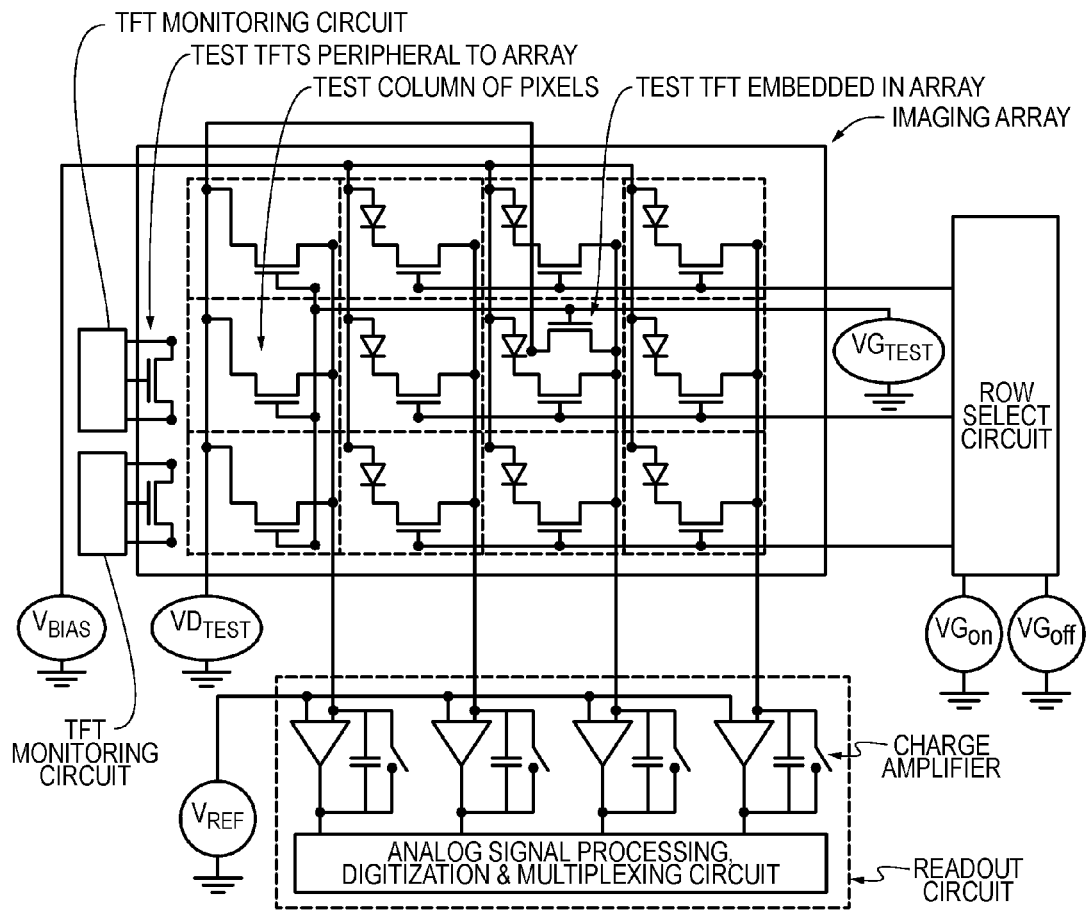
FIG. 7 is a schematic diagram illustrating incorporation of test pixels for determining threshold voltage shift in TFT's, including test cell replacing a pixel inside the array and test columns on the sides of an array and test TFT's peripheral to the image area.

Test TFT's can be placed either on the periphery or in the center of the imaging array. Example placements of test TFTs are shown in FIG. 7. A first example includes placement of test TFTs embedded inside the array. The test TFT has independent addressing for gate voltage $VG_{TEST}$ and for drain voltage $VD_{TEST}$ which are connected to external voltage supplies ($VG_{TEST}$ and $VD_{TEST}$). The source is shown connected to the data line. The test TFT threshold voltage may be measured by monitoring the current on the dataline in the absence of pixel addressing as $VG_{TEST}$ is scanned through $V_T-V_{REF}$. For this scan $VD_{TEST}$ would be set to a voltage selected to yield appropriate current values so that the charge-amplifier is not saturated. In a second example a column of test pixels is placed in the array, either on the periphery as shown in FIG. 7 or in the center of the array. The threshold voltage for the test TFT's would be determined by scanning $VG_{TEST}$ as described above. In a third example individual test TFT's are placed around the periphery of the array and monitored by a TFT test monitoring circuit. Just as with the test pixels in the array, $VG_{TEST}$ would be scanned through $V_T$ to determine the threshold voltage. If the threshold voltage shift since the previous calibration is found to be excessive, a pixel-by-pixel re-calibration of the threshold voltage in the entire array can be performed.

The improved pixel with calibration and correction for threshold voltage variation in the row select TFT comprises (a) a device with adjustable threshold voltage and (b) a circuit for setting the appropriate threshold offset in the threshold voltage compensation device. Separately, a method of sensing the threshold voltage of the row select TFT may be provided.

Figure 8A:
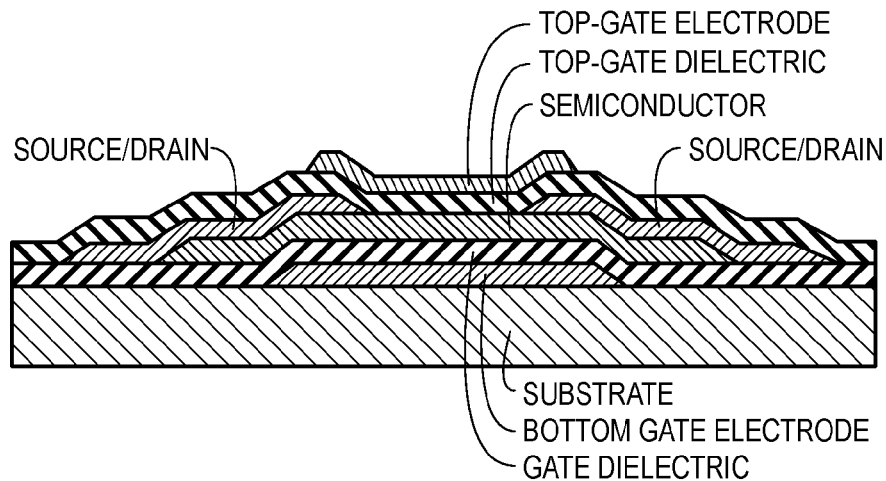
FIGS. 8A-8B are a cross-sectional view of a dual gate TFT, and a plot of transfer characteristics of $I_{DS}$ vs. $V_{GS}$ at several values of top-gate voltage $V_{TG}$ (from K-S Son et al, "Characteristics of Double-Gate Ga—In—Zn—O Thin Film Transistor", IEEE Electron Device Letters, 31, 3, pp. 219-221, March 2010).
Figure 8B:
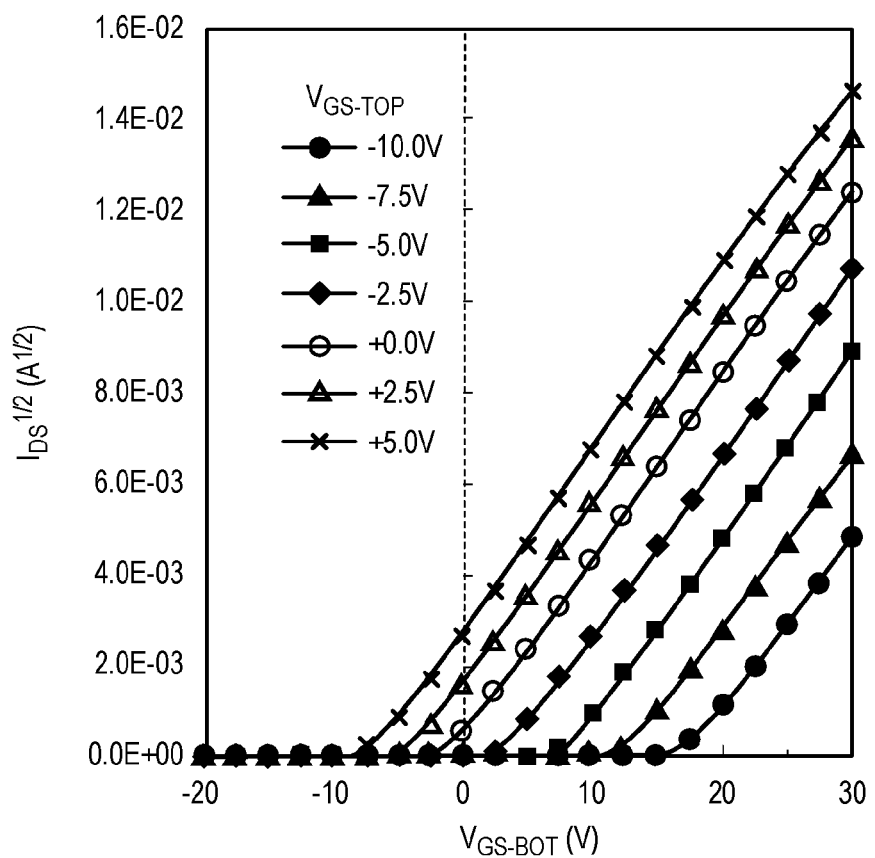

One device with adjustable threshold voltage is the dual gate thin-film-transistor (DGTFT). The transistor is formed with a bottom gate and a top gate, both isolated from the $InGaZnO_4$ channel region by dielectrics, such as plasma enhanced chemical vapor deposited (PECVD) silicon dioxide. An example of an $InGaZnO_4$ dual gate TFT is shown in FIG. 8A in cross-section view. The transfer characteristics drain-source current vs. bottom-gate to source voltage ($I_{DS}$ vs. $V_{BG-S}$) are shown in FIG. 8B for several values of the top-gate to source voltage $V_{TG-S}$. It is observed that adjustment of the top gate voltage to negative values shifts the threshold voltage. Note that the terms "top gate" and "bottom gate" as well as the cross-section of FIG. 3A are for illustrative purposes. The functions of top and bottom gate may be reversed with similar results and a number of cross-sections of dual-gate IGZO and LTPS TFT's have been reported in the literature.

Once calibration has been performed on a detector array, the threshold voltage for each pixel will have been determined. The compensation voltage is the voltage that must be written to the top-gate of the readout row select transistor in order to achieve the desired value. The relationship between the amount of change required in the threshold voltage and the compensation voltage to be written must be determined by an algorithm. In the most extreme case, the algorithm would utilize a device simulation model in which the transfer characteristics $I_{DS}$ vs. $V_{BG-S}$ and vs. $V_{TG-S}$. A compensation voltage to be written to the storage node connected to the top gate would be determined from this device model. However, a simpler algorithm for determining the desired shift in threshold voltage to the compensation voltage could be utilized. As explained herein, successive cycles of calibration and correction can be used to fine-tune the correction voltages.

Figure 9A:
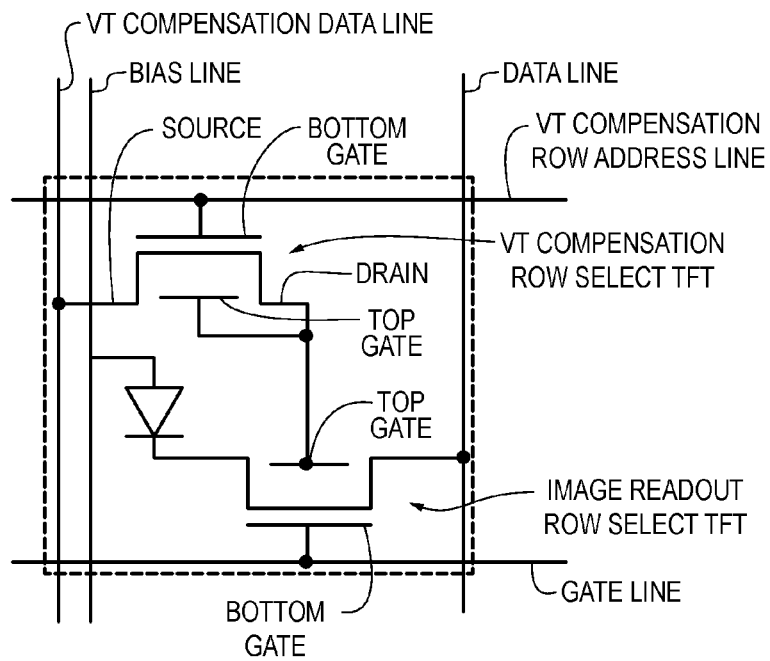
FIGS. 9A-9B are schematic diagrams of an exemplary pixel in an imaging array with compensation for threshold voltage of address transistor, and an array with pixel-level threshold compensation.
Figure 9B:
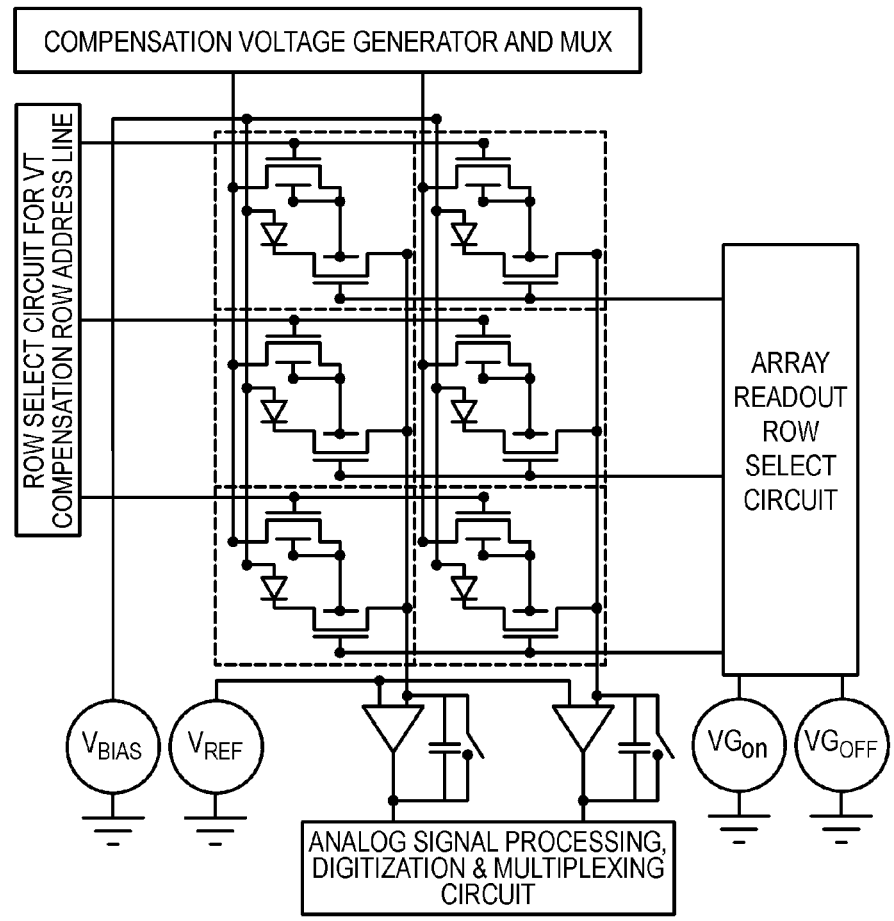

In one embodiment, there is disclosed the calibration and correction circuit of FIGS. 9A-9B. FIG. 9A shows a schematic diagram of a pixel. As compared to the prior art pixel of FIG. 1A, the pixel of FIG. 9A includes a dual-gate $V_T$ compensation row address TFT and substitution of a dual-gate TFT for the single gate TFT of FIG. 1A. The source of the $V_T$ compensation row select TFT is connected to a $V_T$ compensation data line, the drain is connected to the top gate of the dual-gate TFT, the bottom gate is connected to a $V_T$ compensation row address line and the top-gate is connected to the drain of the transistor. The schematic of a 2×3 pixel section of an array utilizing the pixel configuration of FIG. 9A is shown in FIG. 9B. Prior to X-ray exposure, threshold compensation voltages are written into each of the TFT's on a row-by-row basis. The writing of the compensation voltages is controlled by a compensation voltage generator and multiplexer. For a selected row of pixels, the compensation voltage generator and multiplexer writes the compensation voltage onto each VT compensation dataline. The row is selected by a row select circuit which switches the VT compensation row address line to an "on" voltage for the TFT while holding the remaining rows in an "off" voltage. The compensation voltage is written onto the top gates of both the VT compensation select TFT as well as the image readout row select TFT. The compensation voltage is selected to adjust the threshold voltage of each image readout row select TFT to a nominal value.

In a first exemplary mode of operation, the compensation voltages for each pixel would be stored in system memory. Upon power-up the compensation voltages would be written to the pixels on a row-by-row basis by the compensation voltage generator and multiplexer (mux) and by the row select circuit for VT compensation. During this time the image readout row select TFT's would be held in an "off" state by the array readout row select circuit. Once the writing of the compensation voltages has been completed, the array image cycle may be initiated. This would comprise, for example, firing an X-ray generator to create an X-ray image on the photodiodes followed by readout of the array controlled by the array readout row select circuit and the analog signal processing circuit. Subsequent dark frames may also be read-out in order to correct for the array image in the absence of exposure. It is noted that the same compensation voltage is written to both the image readout row select TFT and the $V_T$ compensation row select TFT. Transistors in close proximity typically have similar threshold voltages and respond in a similar manner to temperature and radiation exposure.

Figure 10A:
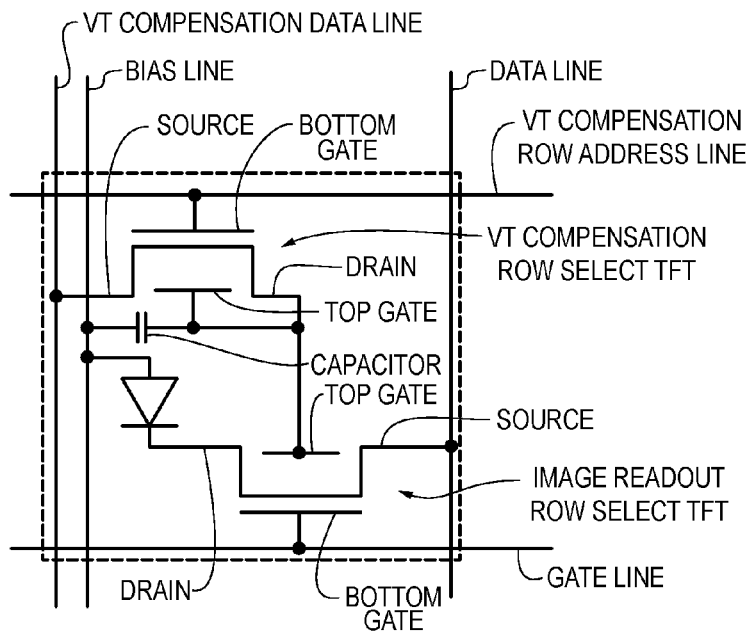
FIGS. 10A-10B are schematic diagrams of an exemplary pixel in an imaging array with compensation for threshold voltage of address transistor including capacitor for storage of compensation voltage, and an array with pixel-level threshold compensation.
Figure 10B:
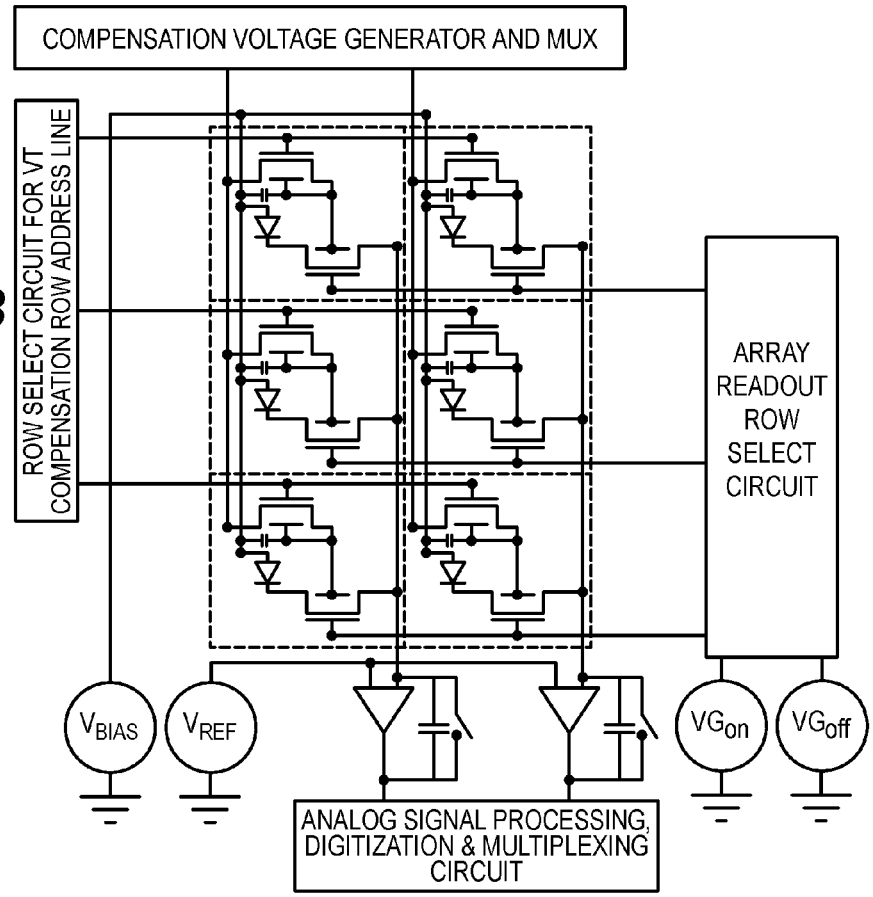

The pixel of FIG. 9A can satisfactorily compensate the threshold voltage during array readout. However, owing to the comparatively low capacitance of the node on which the voltage is written, the charge may decay through leakage in the $V_T$ compensation row select TFT over time, limiting the time between the need to re-write the compensation voltage. To increase this decay time for the compensation voltage, a capacitor can be added to this node. This embodiment is shown in FIGS. 10A-10B, wherein a schematic of the pixel is shown in FIG. 10A. One terminal of the capacitor is connected to the bias line, which is maintained at a DC bias $V_{BIAS}$. The other terminal of the capacitor is connected to the drain of the VT compensation row select TFT. A schematic of a 2×3 segment of the array is shown in FIG. 10B. The array operation is identical to that described in the preceding embodiment of FIGS. 9A-B disclosed above.

Figure 11A:
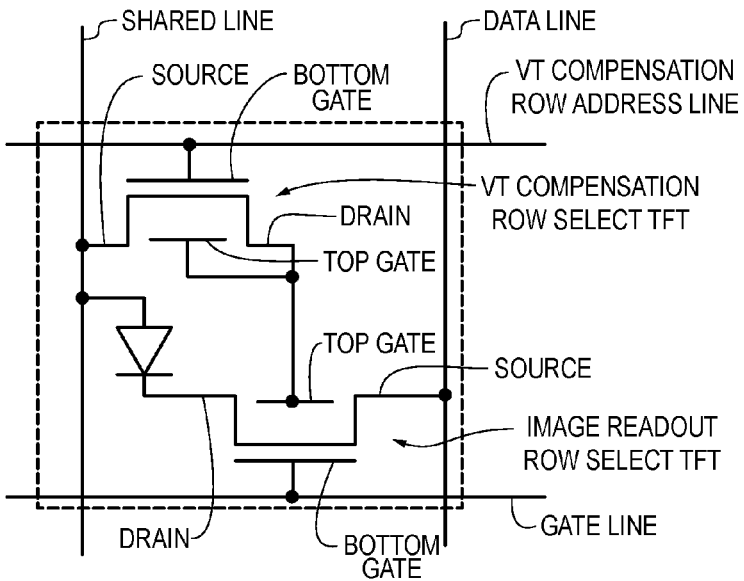
FIGS. 11A-11B are schematic diagrams of a pixel circuit with shared line for photodiode bias supply and VT compensation data line, and an array with pixel-level threshold compensation.
Figure 11B:
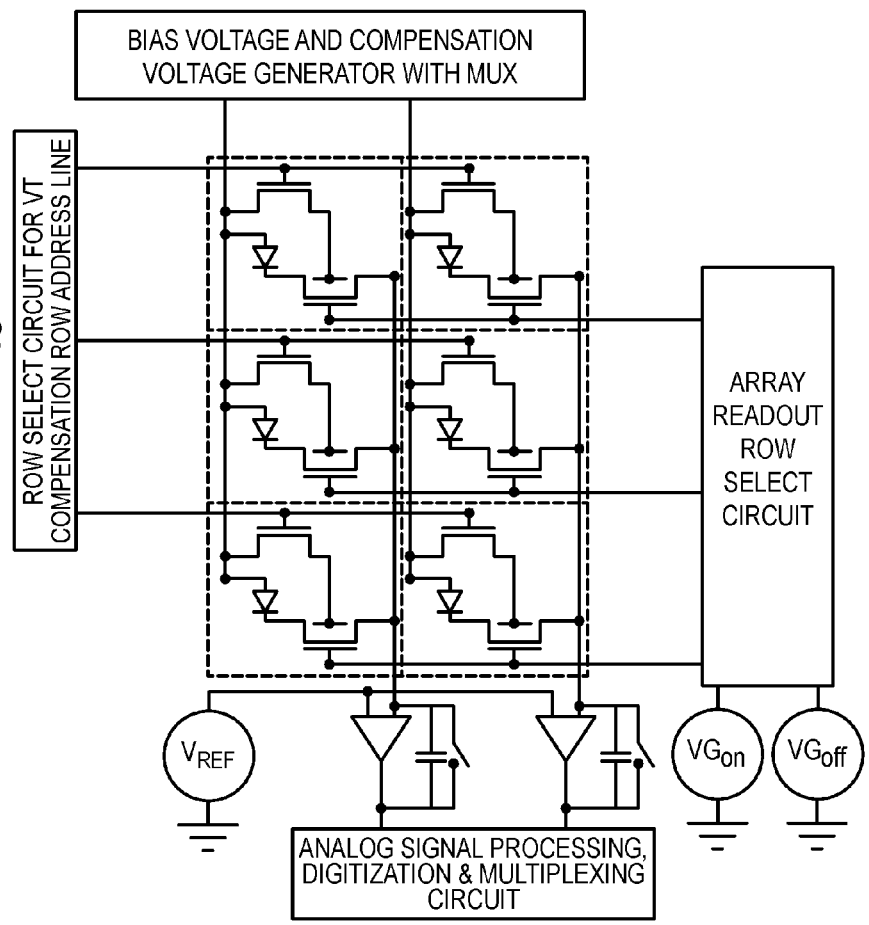

In one embodiment, a separate data line is provided for writing the compensation voltage. A shared line is utilized for both the $V_{BIAS}$ supply for the photodiodes and for the data line for writing compensation voltage. A pixel schematic is shown in FIG. 11A. Since it is anticipated that the writing of the calibration voltage is performed prior to image exposure and readout, the shared line can be used first for writing the compensation voltages to the pixels in a column and subsequently used for bias supply to the photodiodes. Optionally, a capacitor may be added to this pixel as described in the preceding embodiment of FIGS. 10A-B. FIG. 11B shows a 2×3 portion of an array utilizing the pixel configuration of FIG. 11A. During compensation voltage write prior to exposure, the bias voltage and compensation voltage generator with mux generates the compensation voltages for each of the pixels in a particular row. The row is selected by the row select circuit for $V_T$ compensation row address lines and the compensation voltage is written to the pixel through the $V_T$ compensation row select TFT's in that row. Once all the compensation voltages have been written, the bias voltage and compensation voltage generator with mux switches to supply a uniform DC bias voltage $V_{BIAS}$ to the shared lines in all columns. The array may now perform an imaging sequence, using the readout row select circuit, including photodiode reset, exposure and readout through the image readout row select TFT's. The imaging sequence may also comprise dark frames before and/or after the exposed frame for equilibration and dark reference.

Figure 12A:
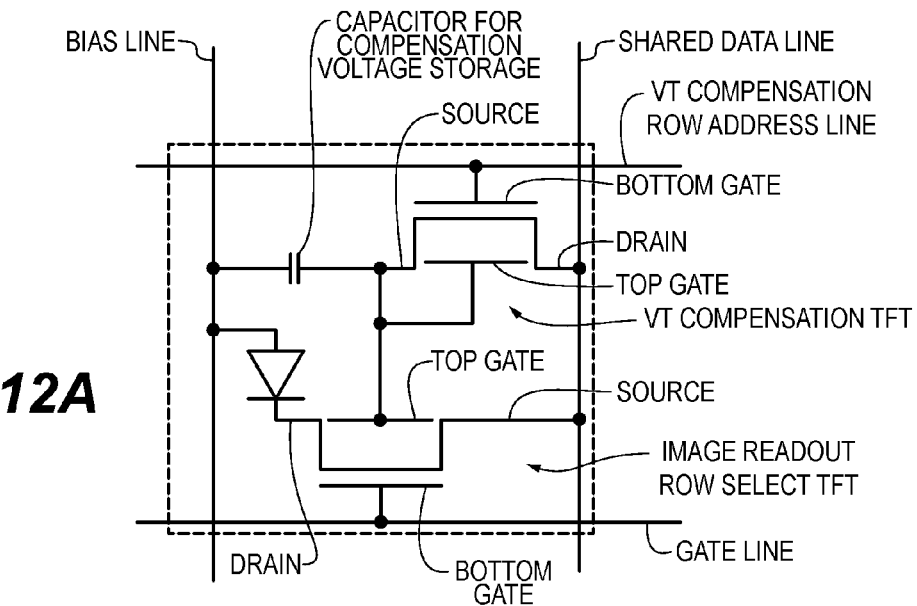
FIGS. 12A-12B are schematic diagrams of a pixel circuit with shared dataline for array readout and for VT compensation write, and an array with pixel-level threshold compensation.
Figure 12B:
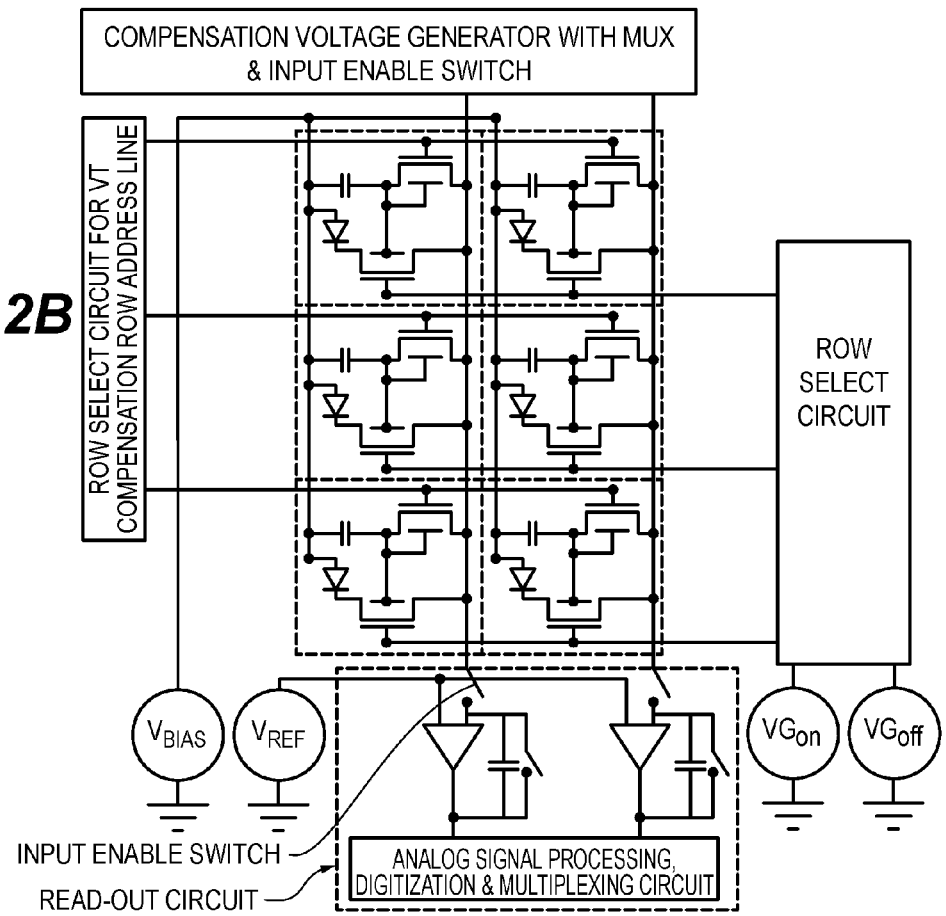

In the preceding embodiment, a shared line was used for photodiode bias and for compensation voltage write. In one embodiment, the data line may be used as the shared line for compensation voltage write prior to the imaging sequence and for image readout during the imaging sequence. A schematic of such a pixel is shown in FIG. 12A. The drain of the $V_T$ compensation TFT is connected to the shared data line, the bottom gate to the $V_T$ compensation row address line, and the source to the top gate of the image readout row select TFT and the top gate of the $V_T$ compensation TFT. An optional capacitor for storage of the compensation voltage is shown connected between the source of the $V_T$ compensation TFT and the bias line. FIG. 12B shows a 2×3 pixel portion of a radiographic imaging array utilizing this pixel configuration. Prior to an imaging sequence, the compensation voltage values are written to the pixels one row at a time using the compensation voltage generator with mux and the VT compensation row select circuit. To allow writing the compensation signals without interference from the readout circuit (row select circuit), an input enable switch is provided on the readout circuit which isolates all the charge amplifiers from the shared dataline. After the compensation signals have been written, the imaging sequence may be initiated. To allow readout of the image signal without interference from the compensation voltage generator, it also is provided with an input enable switch to isolate it from the array during the imaging sequence.

Figure 13:
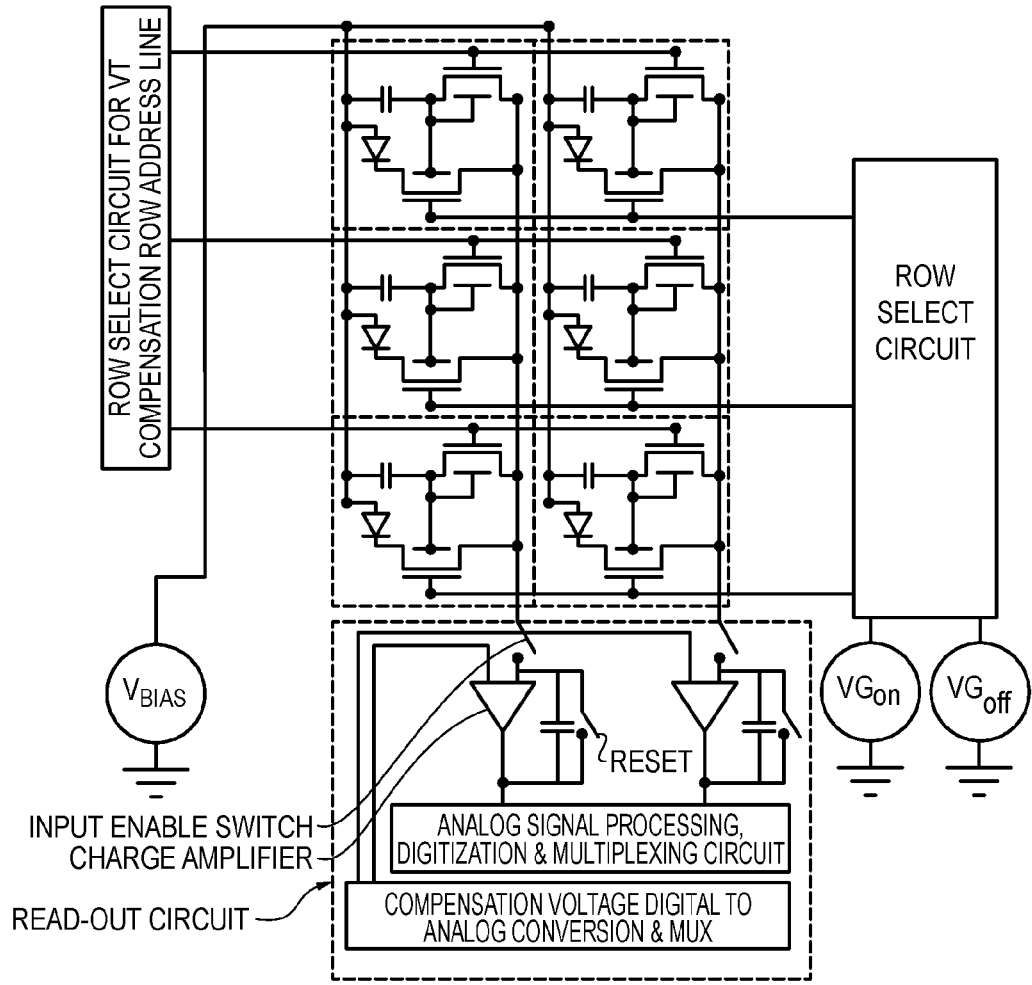
FIG. 13 is a schematic diagram of an imaging array with threshold calibration and correction in which the readout circuit performs both compensation voltage write as well as signal readout.

Another embodiment of a digital radiographic imaging array is shown in FIG. 13. The readout circuit shown therein performs both the compensation voltage write as well as the signal readout. This is achieved by adding a digital to analog conversion of the digital value of the compensation voltage read in from system memory. The analog signal is de-multiplexed to provide a reference voltage value to the inverting input of each charge amplifier. Prior to an imaging sequence, the writing of the compensation voltage values is performed on a row by row basis. During this period the reset switch in all of the charge amplifiers is closed, forcing the dataline to the same voltage as the inverting input of the charge amplifier. This voltage is the compensation voltage value from the compensation voltage D/A conversion and mux circuit. The row select circuit for VT compensation row address lines enables the compensation voltage address TFT in a single row and the compensation voltages are written into the pixels in that row. The write sequence continues until all rows are written. Following writing of the compensation voltages, the image sequence can proceed. For the imaging sequence, the compensation voltage D/A conversion and mux circuit is set to the nominal $V_{REF}$ for all pixels.

A radiographic system employing an array with pixel-by-pixel threshold voltage control may comprise one or more of the following:
1. A memory storage for threshold voltage compensation values for each pixel which can be periodically updated when re-calibration is performed and which can output calibration values to the array
2. An optional monitoring system implemented in hardware and/or software to assess the need for re-calibration of threshold voltage
3. A threshold voltage calibration system for determining the threshold voltage in each pixel. For the calibration methods described previously, this would be implemented in software in a calibration mode of operation of the array
4. A threshold voltage correction mode of operation for writing updated calibration values to each pixel. The updated values can be validated by repeating the threshold voltage calibration.

Figure 14:
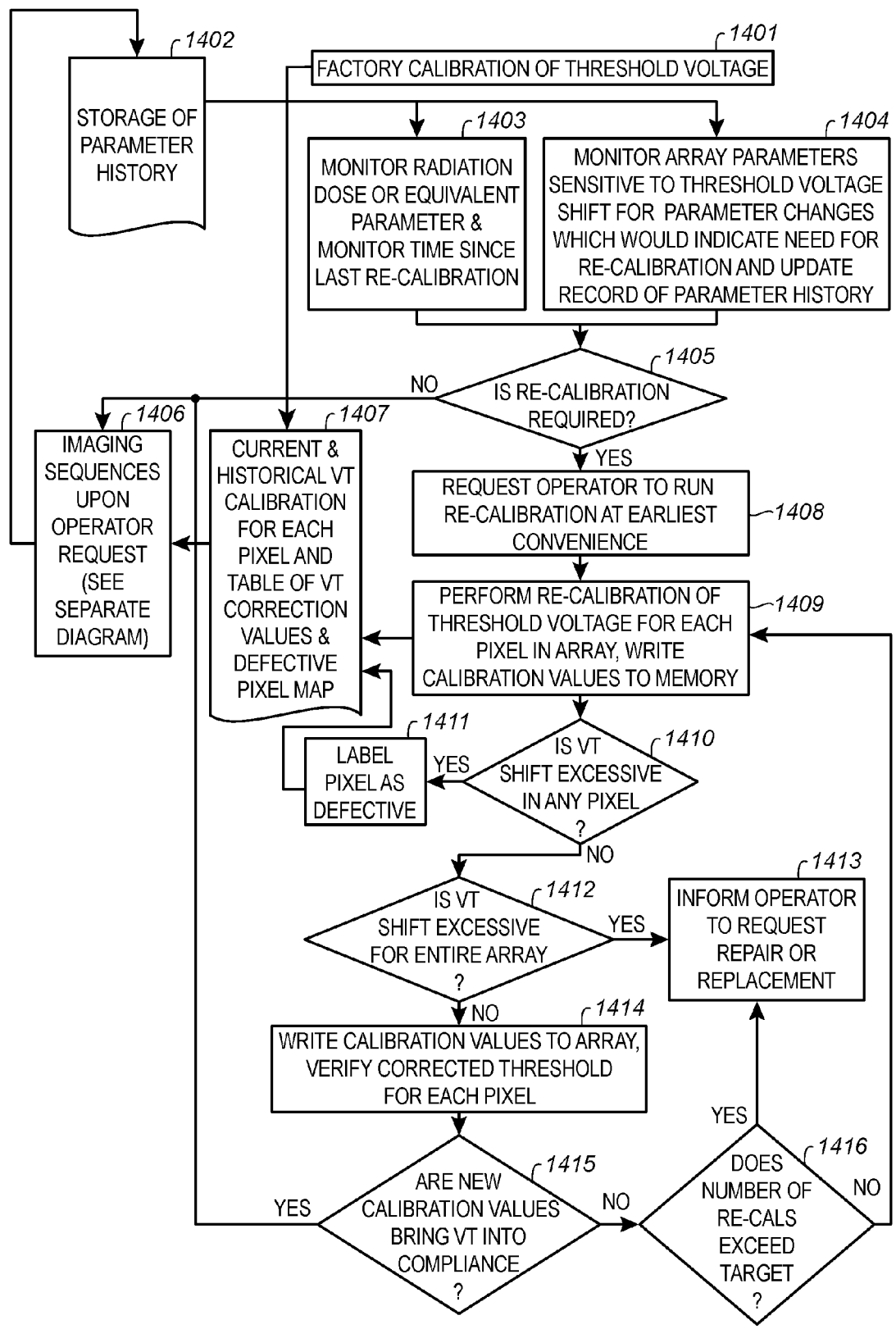
FIG. 14 is a flow diagram of an exemplary detector operation with calibration and correction of threshold voltage.
Figure 15:
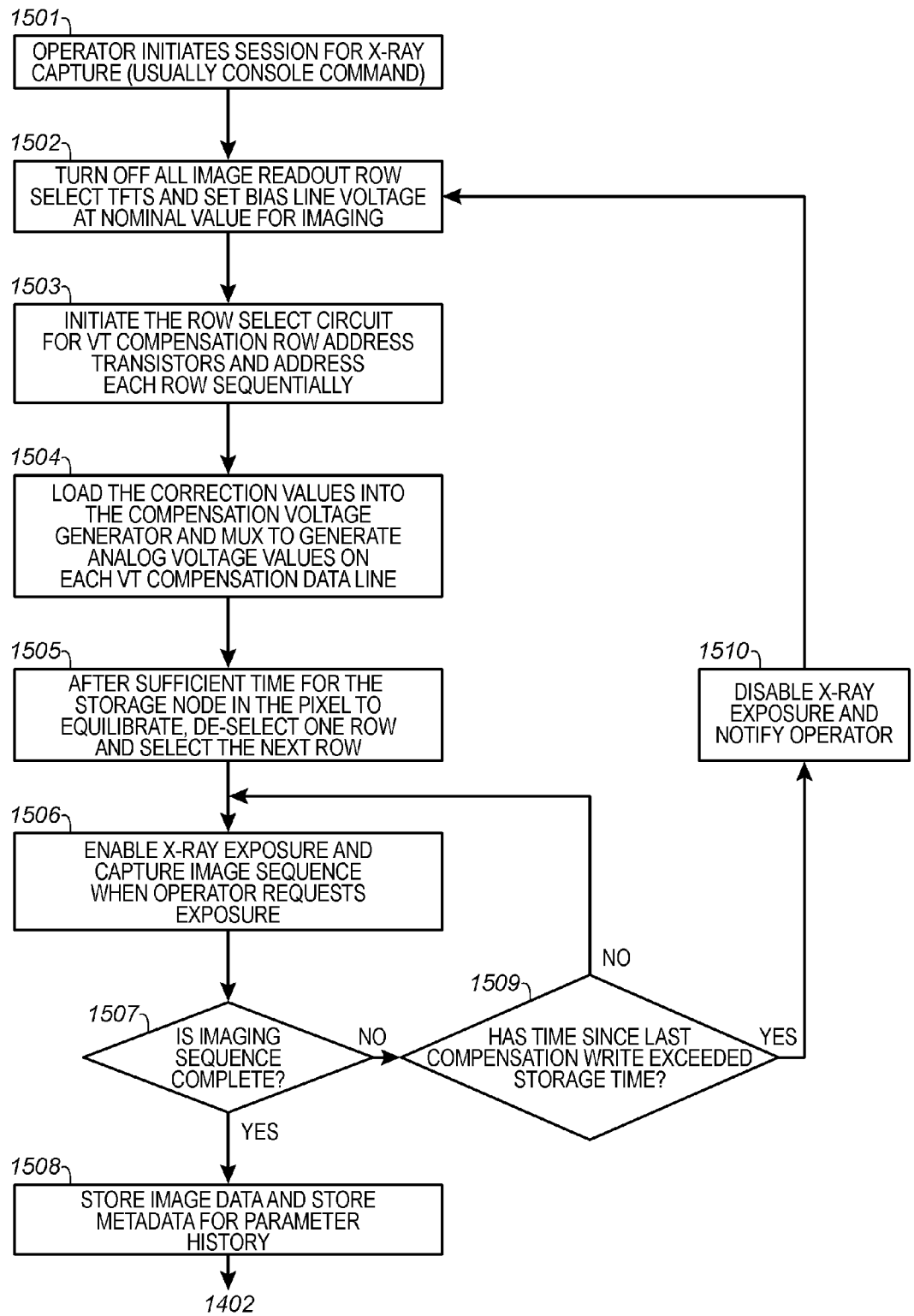
FIG. 15 is a flow diagram of an exemplary imaging sequence for systems in which a console controls the generator and detector.
Figure 16:
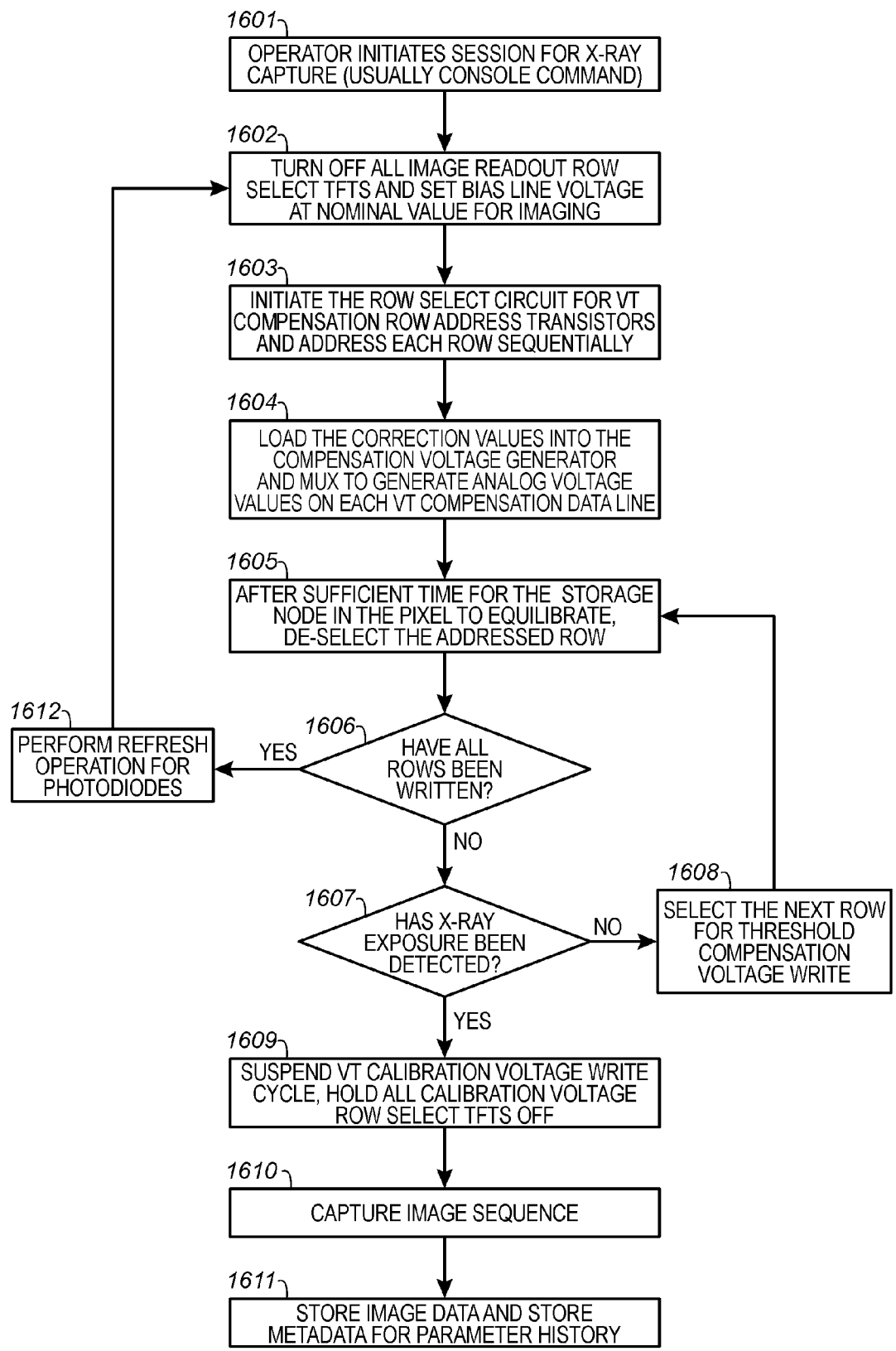
FIG. 16 is a flow diagram of an exemplary imaging sequence for systems in which generator timing is not controlled by the detector.

FIG. 14. shows an exemplary flowchart of the monitoring, calibration and correction processes for an exemplary digital X-ray system. Initial calibration would be performed at the factory or upon installation (1401). The threshold calibration for each pixel would be stored in memory in the detector or console of the digital X-ray system (1407). An example of an imaging sequence for detectors in which the detector has control over the X-ray generator timing is shown in FIG. 15 and an example of an imaging sequence for detectors in which the detector does not control the X-ray timing is shown in FIG. 16. As described in subsequent paragraphs, prior to X-ray exposure the compensation values may be written to each pixel and stored on the storage node in the pixel. Following writing of the values, the detector may perform captures of exposed and dark frames which may be used to create the X-ray image (1406). Additionally, during each imaging sequence or during some portion of the imaging sequence, parameter metadata may be stored (1402) which may be used to determine if re-calibration of threshold voltages for each pixel was required. Examples of such metadata are described hereinabove in the paragraphs labeled First Example through Fourth Example, and may include temperature of the array, operating time of the array, column leakage charge or current measured when no pixels are being addressed (all image readout row select gates are off), mean X-ray exposure determined by the mean exposed frame minus dark frame charge, pixel-by-pixel X-ray exposure determined by summing exposed minus dark images for all capture sequences since the last calibration (or since inception for cumulative dose), or data from test TFT's or pixels (1403, 1404).

The detector system would then evaluate the parameter data written after the imaging sequence to determine if re-calibration of threshold voltages for each pixel is required (1405). As described in the First Method through Fourth Method above, the need for re-calibration may be determined by the total radiation dose since the prior calibration, the number of exposures or detector operating time since the prior calibration, or a particular parameter such as column leakage current which is over a threshold value.

If re-calibration is required, the operator would receive a message to perform a re-calibration at the earliest convenient time (1408). If the calibration method described hereinabove is employed (1409), only dark captures in calibration mode are required and the calibration time would be less than 1-5 minutes. If the re-calibration determines that individual pixels have exceeded the maximum correctable threshold voltage value (1410), then the pixel may be labeled as defective (1411) and added to the pixel defect map (1407). If the re-calibration determines that excessive numbers of pixels exceed the maximum correctable threshold voltage value (1412), then the operator may be instructed to initiate repair or replacement of the array (1413).

Optionally, the compensation values can be verified by writing them into the array and performing a second calibration (1414). If the calibration is successful (1415), all pixels would achieve the target threshold voltage value and imaging may commence (1406). If the difference between actual and target threshold exceeds a threshold, the calibration process can be repeated until convergence or until the number of cycles exceeds a maximum (1416). If the number of calibration cycles exceeds a maximum, then the operator would be requested to return the array for repair or replacement (1413).

FIG. 15 shows an example of a flow chart for an imaging sequence for the case when the detector system also controls the timing of the X-ray exposure (1501). When the detector controls the X-ray generator timing, the firing of the generator can be held momentarily until the compensation values have been written to the array. The write time would typically be about 10-20 µs per row, or less than 0.03-0.06 seconds for an array with 3,000+ rows. To write the correction voltages to the array, the readout row select TFT's would be switched off (1502). Digital values of the correction voltages would be sent from memory to the compensation voltage generator, which would generate analog values for each column. When the row-select circuit for threshold compensation turns on all the compensation TFT's in a row (1503), the voltage is written to the storage capacitor and to the top gates of both the readout row select TFT and $V_T$ compensation row select TFT (1504), and the process is repeated for each row (1505).

The time required for the write depends on the accuracy required and the R-C time constant $\tau_{RC}=R_{TFT} \cdot C_{storage}$ where $R_{TFT}$ is the channel resistance of the $V_T$ compensation row select TFT and $C_{storage}$ is the capacitance of the storage node. For $InGaZnO_4$ or LTPS TFT's fabricated in minimum dimensions supported in typical flat panel display lines, $R_{TFT}$<1 MΩ. The choice of storage capacitance depends on the hold time and accuracy required for the compensation voltage. Loss of charge from the storage capacitor occurs through leakage current in the $V_T$ compensation row select TFT. For $InGaZnO_4$ TFT the leakage is typically less than 1 fA, so a storage capacitance of 0.1 pF would allow a storage time of a second for 10 mV of decay in the compensation voltage. The time constant $\tau_{RC}$=1.0 MΩ·0.1 pF=100 ns. Thus write times of only a few microseconds per row are adequate to achieve less than 1 mV accuracy in the compensation voltage.

Following the writing of the compensation voltages to all rows (1505), the array can return to its normal integrate and readout mode, and the X-ray generator may be enabled, allowing the X-ray exposure to be initiated when the operator requests (1506). Since the compensation voltage stored on $C_{storage}$ can decay over time, periodically the compensation voltages will need to be checked (1509) and refreshed, as described above, or, if the imaging sequence is not completed (1507), the capture sequence is disabled (1510). During the refresh time, expected to be about 0.03 sec or less, firing of the generator would be delayed until the refresh is complete. If the capture and readout of a sequence of exposed and dark images is completed (1507), the images would be stored and metadata required for monitoring the need to re-calibrate would also be stored (1508).

FIG. 16 shows an imaging sequence for a system in which the detector system does not have control over the timing of the generator. This is common when a new detector is used in conjunction with an existing generator (retrofit DR detector) where no modification has been made to enable communication between generator and detector. Such systems use beam-detect to sense the start of X-ray exposure and usually also the end of X-ray exposure. Since the generator may fire at any moment, it is possible that the start of beam will be detected in the middle of a write cycle for calibration voltages. As shown in FIG. 16, once calibration values have been written for a row, the system would determine if X-ray exposure has initiated and, if so, suspend re-writing of the compensation voltages. Steps 1601-1605 are similar to the steps 1501-1505, except that after each row has been written with calibration voltages an x-ray detect procedure checks if all rows have been corrected (1606) and, if so, begins a refresh operation (1612), as explained above, and returns to step 1602. If not (1606), and an x-ray has been detected (1607), the calibration voltage write cycles are suspended (1609), the capture and readout of a sequence of exposed and dark images is completed (1610), the images would be stored and metadata required for monitoring the need to re-calibrate would also be stored (1611). If an x-ray has not been detected (1607) the next row is selected for processing (1608) and the writing of calibration voltages continues at step 1605.

As will be appreciated by one skilled in the art, aspects of the present invention may be embodied as a system, method, hardware product. Accordingly, aspects of the present invention may take the form of an embodiment combining software and hardware aspects that may all generally be referred to herein as a "circuit," "circuitry," "module," "panel," and/or "system."

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, panel, or device. Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language and conventional procedural programming languages, such as the "C" programming language or similar programming languages. The program code may execute entirely on the user's computer (device), partly on the user's computer, as a stand-alone software package, partly on the user's computer and partly on a remote computer, or in a detector panel itself. A remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowcharts, illustrations, and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus such as a detector panel, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A digital radiographic imaging system comprising:
    a two-dimensional array of imaging pixels in which the imaging pixels each comprise a photo-sensing element and a thin-film-transistor readout element, wherein the readout element comprises a first terminal connected to the photo-sensing element, a second terminal connected to a row select circuit, and a third terminal connected to a readout circuit, and wherein the row select circuit and the readout circuit are disposed outside of the two-dimensional array of imaging pixels;
    a calibration means for measuring changes in voltage thresholds of the thin-film-transistor readout elements wherein the voltage thresholds are modified by one or more of (a) X-ray exposure, (b) environmental exposure, (c) temperature, (d) aging, and (e) aging under electrical stress; and
    a compensation circuit for adjusting the voltage thresholds for the thin-film-transistor readout elements based on the measured changes in the threshold voltage of the thin-film-transistors, the compensation circuit comprising:
    a compensation transistor in each of the imaging pixels;
    a column voltage source connected to a first terminal of each of the compensation transistors; and
    a row voltage source connected to a second terminal of each of the compensation transistors.

2. The system of claim 1, wherein the voltage threshold adjusted by the compensation circuit includes
    (a) the $VG_{on}$ voltage used to turn on the thin-film-transistors; and
    (b) the $VG_{off}$ voltage used to turn off the thin-film-transistors.

3. The system of claim 2, wherein the voltage threshold adjustment comprises one or more of the following:
    (a) the adjustment is the same for all pixels in the array of imaging pixels;
    (b) the adjustment is made on a block-by-block basis, wherein a block comprises a group of rows addressed by a common row driver integrated circuit or a group of columns addressed by a common read-out-integrated circuit;
    (c) the adjustment is made on a row-by-row basis;
    (d) the adjustment is made on a column-by-column basis; and
    (e) the adjustment is made individually for each pixel.

4. The system of claim 3, wherein the calibration means for measuring changes in voltage thresholds of the thin-film-transistor readout elements comprises:
    (a) means for writing a first charge on the photo-sensitive element within a pixel by a first bias voltage on the terminal of the photo-sensitive element that is not connected to the TFT.

5. The system of claim 4, wherein the calibration means is configured to perform the measuring at one or more gate line on-times.

6. The system of claim 5, wherein the calibration means is further configured to measure a gate line on-voltage and/or a gate line off-voltage.

7. The system of claim 6, wherein the calibration means is further configured to measure a capacitance between the second and third terminals of the thin-film-transistor.

8. The system of claim 1, wherein the compensation transistor in each of the imaging pixels comprises a third terminal coupled to the second terminal of the thin-film transistor readout element.

9. The system of claim 8, wherein the third terminal of the compensation transistor is configured to provide a voltage magnitude proportional to the measured change in voltage threshold of the thin-film transistor readout elements.

10. A plurality of digital imaging pixels and test elements arranged in a two-dimensional array of rows and columns, each of the imaging pixels within the array comprising:
    a photo-sensing element electrically connected to a bias voltage source; and
    a readout element having a first terminal connected to the photo-sensing element, a second terminal connected to a row select circuit, and a third terminal connected to a readout circuit;
    each of the test elements within the two-dimensional array having a first terminal connected to a first test voltage source, a second terminal connected to a second test voltage source, and a third terminal connected to the readout circuit,
    wherein the bias voltage source, the row select circuit, and the readout circuit are disposed outside of the two-dimensional array of rows and columns, and
    wherein the imaging pixels and the test elements are connected to the readout circuit using data lines, and wherein the readout circuit is configured to measure a level of electrical current on a selected data line as the second test voltage source applies a varying voltage to the second terminal of one of the test elements connected to the selected data line.

11. The array of claim 10, wherein the test element comprises a thin film transistor.

12. The array of claim 11, wherein the second terminal of the test element comprises a gate of the thin film transistor, and wherein the third terminal of the test element comprises a source of the thin film transistor.

13. The array of claim 12, wherein the first terminal of the test element comprises a drain of the thin film transistor.

14. The array of claim 10, wherein the row select circuit is configured to be deactivated while the readout circuit is configured to measure the level of electrical current on the selected data line.

15. The array of claim 10, wherein the first test voltage source is configured to apply a voltage to the first terminal of the test element such that the readout circuit is not saturated.

16. The array of claim 10, wherein the level of electrical current measured on the selected data line is used to determine a threshold voltage of said one of the test elements connected to the selected data line.

17. The array of claim 16, further comprising a compensation circuit configured to provide a compensation voltage to each of the imaging pixels within the array based on the determined threshold voltage of said one of the test elements.

18. A plurality of digital imaging pixels and test elements arranged in a two-dimensional array of rows and columns, each of the imaging pixels within the array comprising:
   a photo-sensing element electrically connected to a bias voltage source; and
   a readout element having a first terminal connected to the photo-sensing element, a second terminal connected to a row select circuit, and a third terminal connected to a readout circuit;
   each of the test elements within the two-dimensional array having a first terminal connected to a first test voltage source, a second terminal connected to a second test voltage source, and a third terminal connected to the readout circuit,
   wherein the bias voltage source, the row select circuit, and the readout circuit are disposed outside of the two-dimensional array of rows and columns,
   wherein the further comprises a plurality of test elements disposed outside of the two-dimensional array of rows and columns,
   wherein each of the test elements disposed outside of the two-dimensional array of rows and columns comprise a construction substantially similar to each of the test elements within the two-dimensional array and substantially similar to the readout element of each of the imaging pixels within the array,
   and wherein each of the test elements disposed outside of the two-dimensional array comprises a first terminal, a second terminal, and a third terminal all connected to a corresponding thin film transistor monitoring circuit, the thin film transistor monitoring circuit configured to determine a threshold voltage of the test element connected thereto.

19. The array of claim 18, wherein none of the test elements include a photo-sensing element.

* * * * *

UNITED STATES PATENT AND TRADEMARK OFFICE
CERTIFICATE OF CORRECTION

PATENT NO. : 9,851,459 B2
APPLICATION NO. : 14/972628
DATED : December 26, 2017
INVENTOR(S) : Timothy J. Tredwell Page 1 of 1

It is certified that error appears in the above-identified patent and that said Letters Patent is hereby corrected as shown below:

Column 6, Line 20  Replace "diagram of FIGS. 3A-3B, $C_s$=€€$_o$L$_s$W/T$_{ox}$ where £" with -- diagram of FIGS. 3A-3B, $C_S$=εε$_o$L$_S$W/T$_{ox}$ where ε --

Column 6, Line 21  Replace "dielectric constanst €$_o$ is the free-space dielectric constant" with -- dielectric constant, ε$_o$ is the free-space dielectric constant --

Column 6, Line 28  Replace the following equation "$C_{GS}(V_{GS} > VT) = C_S + C_{CH}/2 = $££$_o(L_S+ L_{CH}/2) \cdot W/T_{ox}$" with -- $C_{GS}(V_{GS} > VT) = C_S + C_{CH}/2 = εε_o(L_S+ L_{CH}/2) \cdot W/T_{ox}$= --

Column 18, Line 13  Replace "wherein the further" with -- wherein the array further --

Signed and Sealed this
Eighteenth Day of September, 2018

Andrei Iancu
*Director of the United States Patent and Trademark Office*